United States Patent
Kang et al.

(10) Patent No.: US 6,421,407 B1
(45) Date of Patent: Jul. 16, 2002

(54) NUCLEAR FUEL SPACER GRID WITH DIPPER VANES

(75) Inventors: Heung-Seok Kang; Kyung-Ho Yoon; Hyung-Kyu Kim; Kee-Nam Song; Youn-Ho Jung; Tae-Hyun Chun; Dong-Seok Oh; Wang-Kee In, all of Taejon-si (KR)

(73) Assignees: Korea Atomic Energy Research Institute, Taejon-si; Korea Electric Power Corporation, Seoul, both of (KR)

( * ) Notice: Subject to any disclaimer, the term of this patent is extended or adjusted under 35 U.S.C. 154(b) by 0 days.

(21) Appl. No.: 09/439,714

(22) Filed: Nov. 12, 1999

(30) Foreign Application Priority Data

Jun. 11, 1999 (KR) .............................. 99-21652

(51) Int. Cl.$^7$ .............................. G21C 3/352
(52) U.S. Cl. .............. 376/439; 376/438; 376/442; 376/443; 376/462
(58) Field of Search ............. 376/438, 439, 376/442, 443, 453, 462

(56) References Cited

U.S. PATENT DOCUMENTS

| | | | | |
|---|---|---|---|---|
| 3,764,470 A | * | 10/1973 | Calvin | 376/439 |
| 3,809,609 A | * | 5/1974 | Krawiec et al. | 376/439 |
| 4,089,741 A | * | 5/1978 | Patterson et al. | 376/439 |
| 4,125,434 A | * | 11/1978 | Formel et al. | 176/76 |
| 4,576,786 A | * | 3/1986 | DeMario | 376/439 |
| 4,726,926 A | | 2/1988 | Patterson et al. | 376/439 |
| 4,728,489 A | * | 3/1988 | Hatfield | 376/439 |
| 4,803,043 A | | 2/1989 | DeMario et al. | 376/442 |
| 4,844,860 A | * | 7/1989 | Hatfield | 376/439 |
| 5,299,245 A | * | 3/1994 | Aldrich et al. | 376/439 |
| 5,307,393 A | * | 4/1994 | Hatfield | 376/442 |
| 5,331,679 A | * | 7/1994 | Hirukawa | 376/439 |
| 5,402,457 A | * | 3/1995 | Suchy et al. | 376/443 |
| 5,440,599 A | * | 8/1995 | Rodack et al. | 376/439 |

OTHER PUBLICATIONS

Document No. 425052, Sep. 1999, Research Disclosure.*

* cited by examiner

*Primary Examiner*—Michael J. Carone
*Assistant Examiner*—Jack Keith
(74) *Attorney, Agent, or Firm*—Bachman & LaPointe, P.C.

(57) ABSTRACT

A nuclear fuel spacer grid, fabricated by intersecting a plurality of zircaloy or inconel grid strips and used for placing and supporting a plurality of elongated fuel rods within a nuclear fuel assembly, is disclosed. In the spacer grid of this invention, each of the grid strips is not cut away to form separate springs or dimples for supporting the fuel rods, but has an axial slot extending from one end of each strip to a length. The grid strips are intersected at the slots prior to being welded together into a single grid structure at a welding tap formed at an outside end or a middle portion of each of the slots. Each of the grid strips also has a dipper-shaped coolant mixing vane, or a dipper vane, at each of the upper and lower ends thereof. The spacer grid thus maximizes the thermal hydraulic coolant mixing effect within a fuel assembly and stably supports the fuel rods within the assembly while improving the mechanical/structural strength of the assembly, such as a buckling strength.

6 Claims, 9 Drawing Sheets

NUCLEAR FUEL SPACER GRID WITH DIPPER VANES

BACKGROUND OF THE INVENTION

1. Field of the Invention

The present invention relates, in general, to a spacer grid used for placing and supporting a plurality of nuclear fuel rods within a nuclear fuel assembly and, more particularly, to a nuclear fuel spacer grid with dipper vanes designed to maintain a desired space between the elongated fuel rods and to appropriately support the fuel rods and to prevent the vibrating or fretting corrosion of the fuel rods while allowing coolant to smoothly flow within the fuel assembly and resulting in a high coolant mixing effect and retaining a desired structural strength of the fuel assembly even in case of the occurrence of an emergency.

2. Description of the Prior Art

In conventional light water reactors, a plurality of elongated nuclear fuel rods 125 are regularly and parallelly arranged in an assembly 101 having a square cross-section in a way such that, for example, fourteen, fifteen, sixteen or seventeen fuel rods 125 are regularly arranged along each side of the square cross-section, thus forming a 14×14, 15×15, 16×16, or 17×17 array as shown in FIG. 1. In such a nuclear fuel assembly 101, the elongated fuel rods 125, fabricated by containing a fissile material within a hermetically sealed elongated zircaloy tube 114 known as the cladding, are placed and supported by a plurality of spacer grids 110. Each of such spacer grids 110 is produced by welding a plurality of intersecting grid strips to each other into an egg-crate pattern prior to encircling the periphery of each grid 110 by four perimeter strips. The top and bottom of the fuel assembly 101 are, thereafter, covered with pallets 111 and 112, respectively. The fuel assembly 101 is thus protected from any external loads acting on the top and bottom thereof. The spacer grids 110 and the pallets 111 and 112 are also integrated into a single structure using a plurality of guide tubes 113. A framework of the fuel assembly 101 is thus fabricated.

Each of the above spacer grids 110 is fabricated as follows. As best seen in FIG. 2, two sets of grid strips 115 and 116, individually having a plurality of notches at regularly spaced positions, are assembled with each other by intersecting the two sets of strips 115 and 116 at the notches, thus forming a plurality of four-walled cells individually having four intersections 117. The assembled strips 115 and 116 are, thereafter, welded together at the intersections 117 prior to being encircled by the perimeter strips 118, thus forming a spacer grid 110 with such four-walled cells. As shown in FIG. 3, a plurality of positioning springs 119 and a plurality of positioning dimples 120 are integrally formed on or attached to the rid strips 115 and 116 in a way such that the springs 119 and the dimples 120 extend inwardly within each of the four-walled cells. In such a case, the dimples 120 are more rigid than the springs 119. In each of the four-walled cells, the positioning springs 119 force a fuel rod 125 against associated dimples 120, thus elastically positioning and supporting the fuel rod 125 at four points within each of the cells. In the above nuclear fuel assembly 101, a plurality of grids 110 are regularly and perpendicularly arranged along the axes of the fuel rods 125 at right angles, thus placing and supporting the fuel rods 125 at multiple points. The grids 110 thus function as a multi-point support means for placing and supporting the fuel rods 125 within the fuel assembly 101.

In conventional light water reactors of Korea, water is used as coolant. In such a light water reactor, water receives thermal energy from the fuel rods 125 prior to converting the thermal energy into electric energy. During an operation of the nuclear fuel assembly 101 of such a reactor, water or liquid coolant is primarily introduced into the assembly 101 through an opening formed on the core supporting lower plate of the reactor. In the above assembly 101, coolant flows upwardly through the passages, defined between the fuel rods 125, and receives thermal energy from the fuel rods 125. The sectioned configuration of the coolant passages, provided within the fuel assembly 101, is shown in FIG. 4.

Since the elongated, parallel fuel rods, having a circular cross-section, are closely arranged within a fuel assembly, having a rectangular configuration, while being spaced apart from each other at irregular intervals, the temperature of coolant flowing around the fuel rods is variable in accordance with positions. Therefore, it is almost impossible to obtain a uniform temperature distribution within such a conventional fuel assembly. Thus, the coolant passages of the fuel assembly may be partially overheated at positions adjacent to the fuel rods having a high temperature. Such partially overheated regions of the coolant passages deteriorate soundness of the assembly and reduce the output power of the fuel rods. In order to remove such partially overheated regions from a nuclear fuel assembly, it is necessary to design the spacer grids in a way such that the grids allow a uniform temperature distribution of the coolant within the fuel assembly while effectively deflecting and mixing the coolant within the assembly. A conventional example of such designed grids is disclosed in Korean Patent Publication No. 91-7921. In the grid disclosed in the above Korean patent, so-called "mixing blades" or "vanes" are attached to the upper portion of each grid and are used for mixing coolant within the fuel assembly. That is, the mixing blades or vanes allow the coolant to flow laterally in addition to normally longitudinally, and so the coolants are effectively mixed with each other between the passages and between the lower temperature regions and the partially overheated regions of the fuel assembly.

The important factors necessary to consider while designing the grids 110 for use in nuclear fuel assemblies are improvement in both the fuel rod supporting function of the grids 110 and the buckling strength resisting a laterally directed force acting on the grids 110. During an operation of a nuclear reactor, the fuel assembly 101 may be vibrated laterally due to a load acting on the assembly and this causes an interference between the fuel rods within the assembly. Therefore, the grids of the fuel assembly may be impacted due to such an interference between the fuel rods as disclosed in U.S. Pat. No. 4,058,436. In the prior art, the grid's buckling strength, resisting a lateral load acting on the grid, is reduced since the grid strips have to be partially cut away through, for example, a stamping process at a plurality of portions so as to form positioning springs 119 and dimples 120 within a fuel assembly. Such cut-away portions (or windows) reduce the effective cross-sectional area of the grid 110 capable of resisting impact, thus reducing the buckling strength of the grid 110. Therefore, it is almost impossible to avoid a reduction in the buckling strength of the grid 110 in a conventional design of grids wherein the grid strips have to be partially cut away to form such positioning springs 119 and the dimples 120.

In the conventional nuclear fuel assembly 101, the fuel rods 125 are placed and supported by positioning springs 119 and the positioning dimples 120 within the grids 110. However, the lateral flow or mixing of coolant regrettably vibrates the elongated, parallel, closely spaced fuel rods 125 within the assembly, and so the fuel rods 125 easily and periodically interfere with the intersecting strips of the grids 110. When the fuel rods 125 are so vibrated for a lengthy period of time, the claddings of the fuel rods 125 are repeatedly and frictionally abraded at their contact parts at which the fuel rods 125 are brought into contact with the springs and dimples of the grids 110. The claddings are thus reduced in their thicknesses so as to be finally perforated at the grid contact parts. Such an abrasion of the fuel rods 125 is so-called "fretting wear" in the art. It has been noted that such a fretting wear is caused when there is any gap between the fuel rods, the positioning springs and the positioning dimples. However, such a fretting wear may be prevented by a structurally improved spacer grid capable of more effectively placing and supporting the fuel rods within the fuel assembly. Therefore, it is necessary to provide a spacer grid having a fuel rod supporting structure designed to more firmly support the fuel rods in comparison with conventional grids having one spring and four dimples or two springs and four dimples.

SUMMARY OF THE INVENTION

Accordingly, the present invention has been made keeping in mind the above problems occurring in the prior art, and an object of the present invention is to provide a nuclear fuel spacer grid of which each grid strip has a lower dipper vane at its lower end so as to control the inflow direction of coolant and an upper dipper vane at its upper end so as to swirl the outflow coolant, thus allowing the coolant to more strongly swirl while flowing within a fuel assembly and improving the thermal efficiency of the fuel assembly.

Another object of the present invention is to provide a nuclear fuel spacer grid, of which the grid strips are not cut away (i.e. windowless) at any portion for forming separate spring or dimples, thereby having a desired mechanical and structural strength, such as a desired buckling strength capable of effectively resisting lateral load acting thereon, and which uses thin grid strips capable of having a desired strength expected from conventional thick strips, thus reducing resistance to the flow of coolant within the fuel assembly and improving the thermal hydraulic performance of the fuel assembly.

A further object of the present invention is to provide a nuclear fuel spacer grid, which increases the number of fuel rod supporting points and supports the fuel rods at its upper and lower ends, thus more effectively supporting the fuel rods while protecting the fuel rods from fretting wear.

The nuclear fuel spacer grid of this invention comes into contact with the fuel rods at positioning springs without having dimples, thus being effectively increased in flexibility in comparison with conventional grids having both the springs and the dimples.

In order to accomplish the above objects, the present invention provides a nuclear fuel spacer grid fabricated by intersecting a plurality of zircaloy or inconel grid strips and used for placing and supporting a plurality of elongated fuel rods within a nuclear fuel assembly. In the spacer grid of this invention, each of the grid strips is not cut away to form separate springs or dimples for supporting the fuel rods, but has an axial slot extending from one end of each strip to a length. The grid strips are intersected at the slots prior to being welded together into a single structure at a tap formed at an outside end or a middle portion of each of the slots. Each of the grid strips also has a dipper-shaped coolant mixing vane, or a dipper vane, at each of upper and lower ends thereof. The spacer grid thus maximizes the thermal hydraulic coolant mixing effect within a fuel assembly and stably supports the fuel rods within the assembly while improving the mechanical/structural strength of the assembly, such as a buckling strength.

BRIEF DESCRIPTION OF THE DRAWINGS

The above and other objects, features and other advantages of the present invent ion will be more clearly understood from the following detailed description taken in conjunction with the accompanying drawings, in which:

FIG. 5b is a perspective view of the spacer grid of FIG. 5a;

DESCRIPTION OF THE PREFERRED EMBODIMENTS

Figure 1:
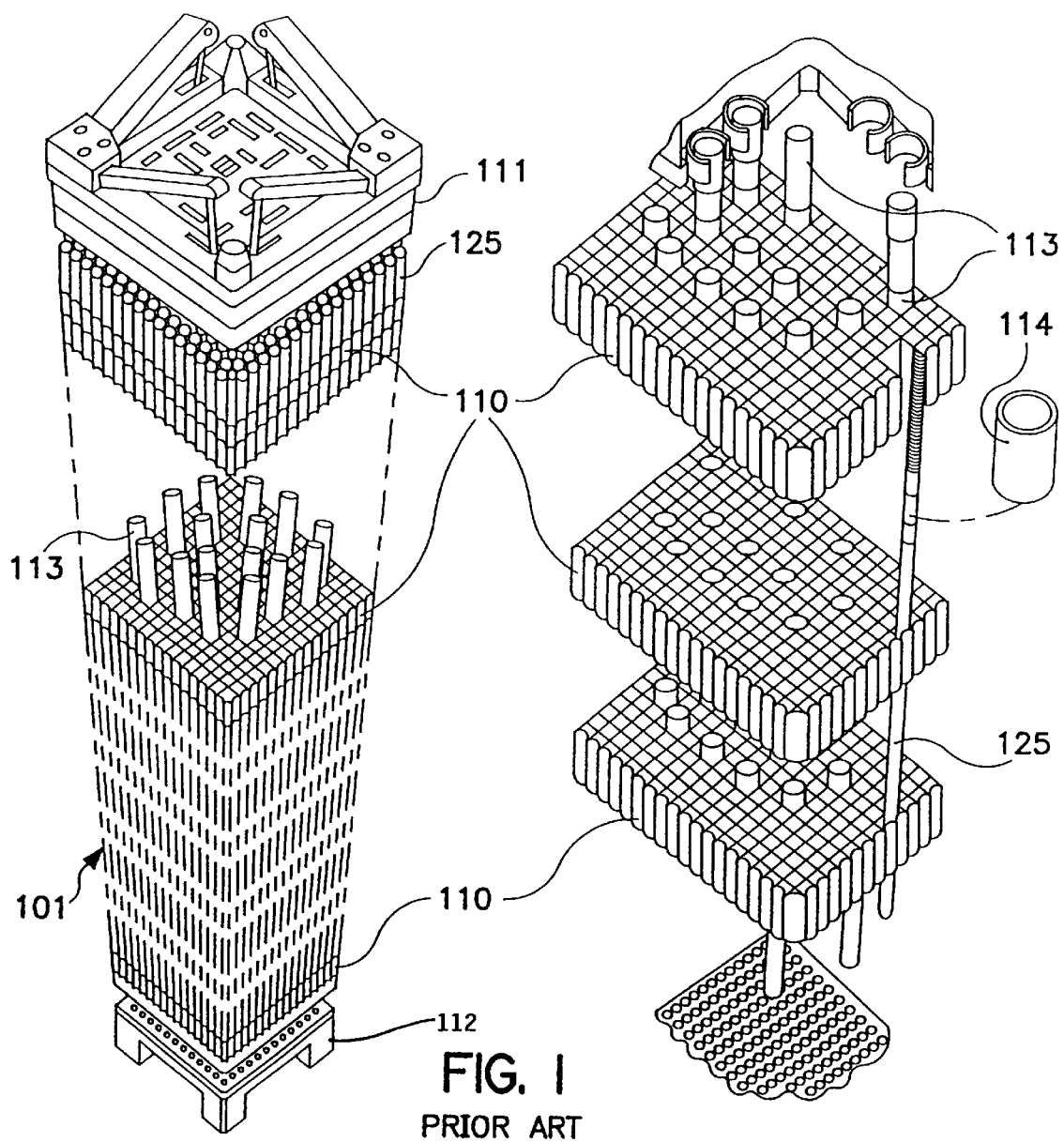
FIG. 1 is a perspective view, showing the construction of a conventional nuclear fuel assembly for use in pressurized light water reactors.
Figure 2:
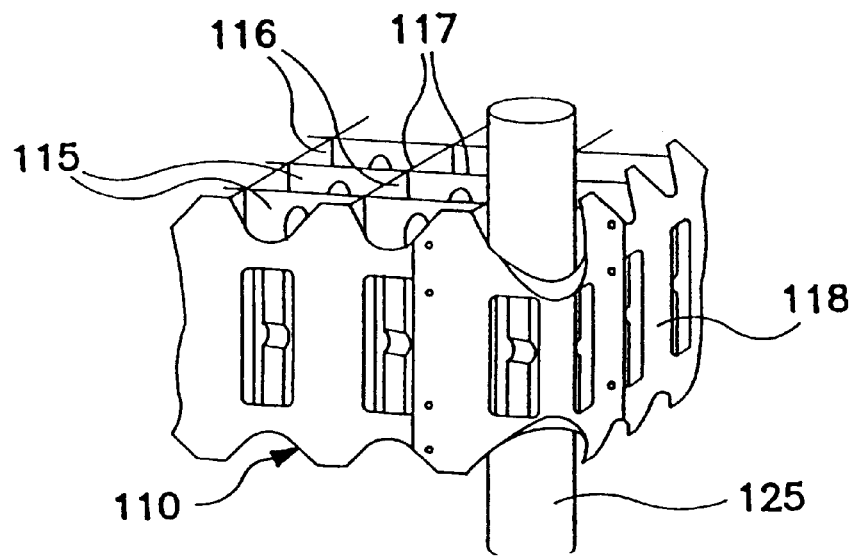
FIG. 2 is a partial perspective view, showing a conventional spacer grid used for placing and supporting elongated fuel rods within the fuel assembly of FIG. 1.
Figure 4:
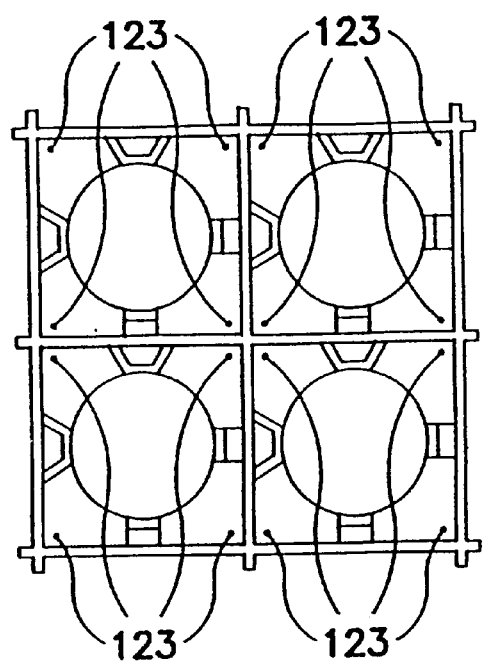
FIG. 4 is a cross-sectioned view, showing four fuel rods individually placed and supported within a four-walled cell of the grid of FIG. 2 with coolant passages being formed around each fuel rod within each cell.
Figure 3:
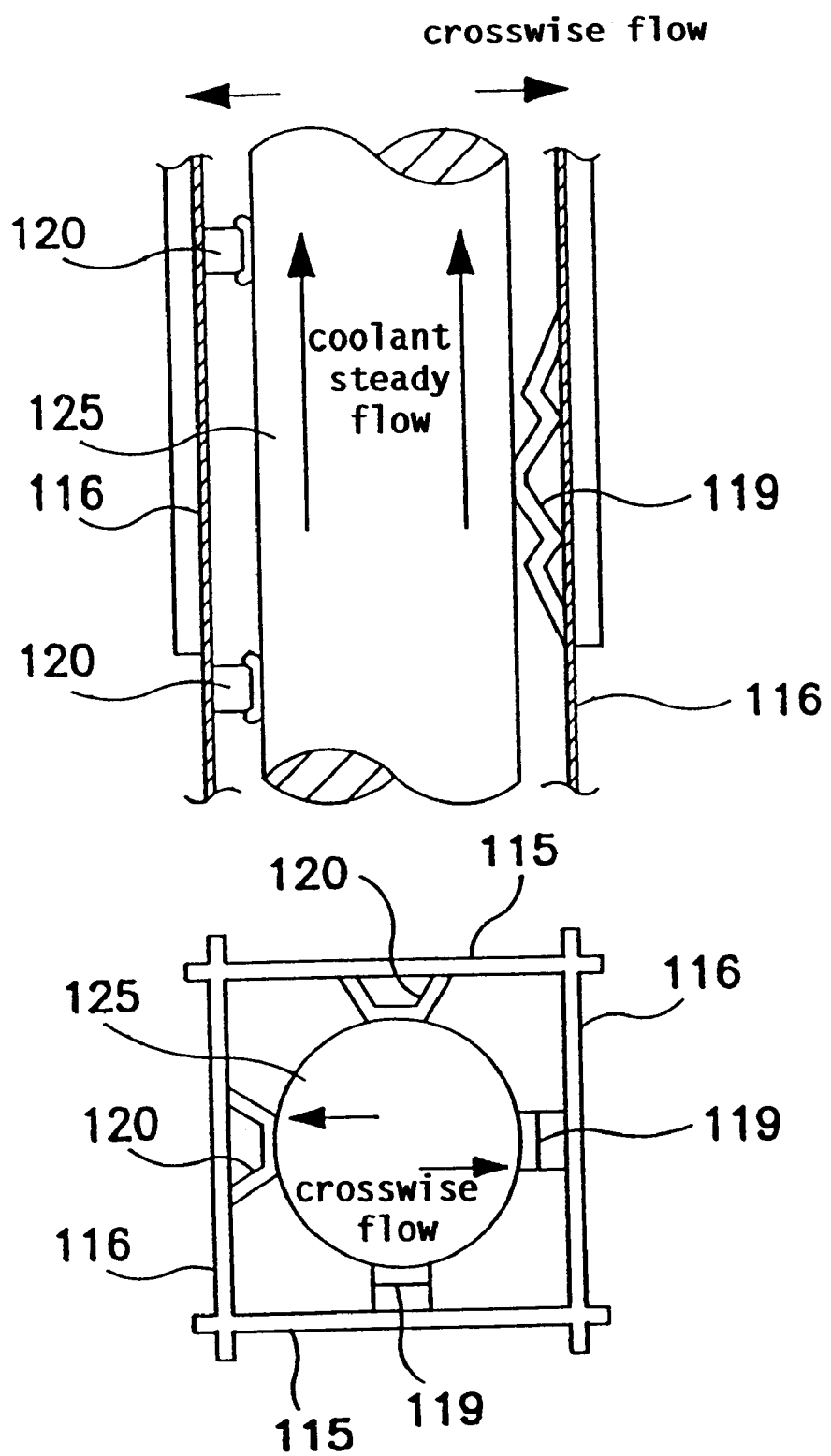
FIG. 3 shows a fuel rod, placed and supported by positioning springs and dimples within a four-walled cell of the grid of FIG. 2, in a front view and a cross-sectioned view.
Figure 5A:
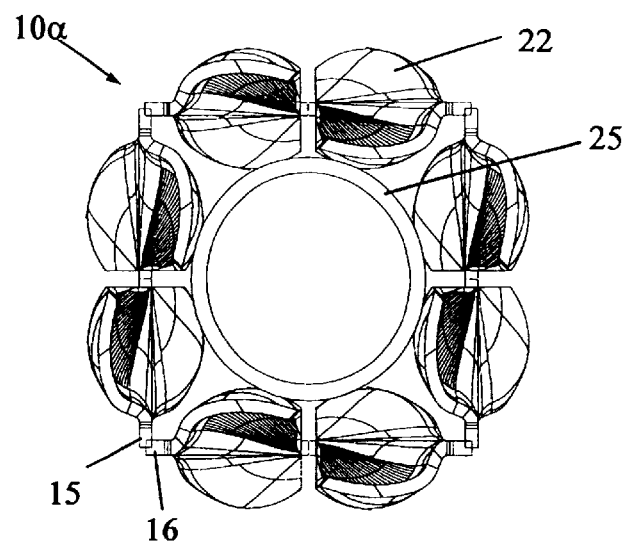
FIG. 5a is a plan view, showing a one cell spacer grid with dipper vanes for nuclear fuel assemblies in accordance with the primary embodiment of the present invention.
Figure 5B:
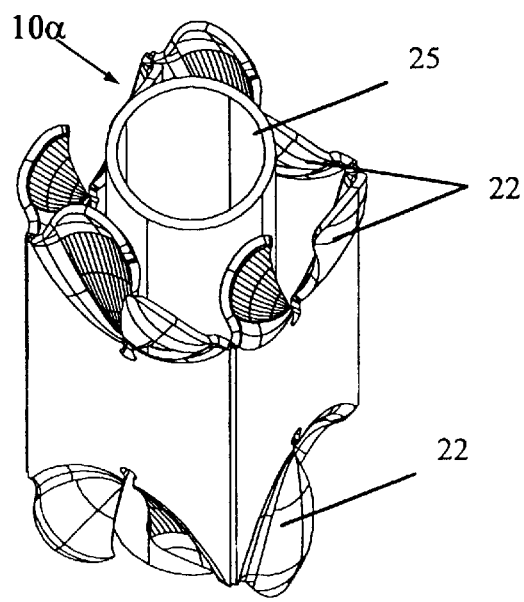

FIGS. 5a and 5b show a one cell spacer grid for nuclear fuel assemblies in accordance with the primary embodiment of this invention. As shown in the drawings, the one cell spacer grid 10a is designed to place and support one elongated fuel rod 25. This spacer grid 10a comprises a plurality of grid strips 15 and 16, which are integrated into a four-walled cell having a square cross-section and being used for placing and supporting one fuel rod 25. The configuration and construction of one of the grid strips 15 and 16 is shown in FIG. 6.

Figure 6:
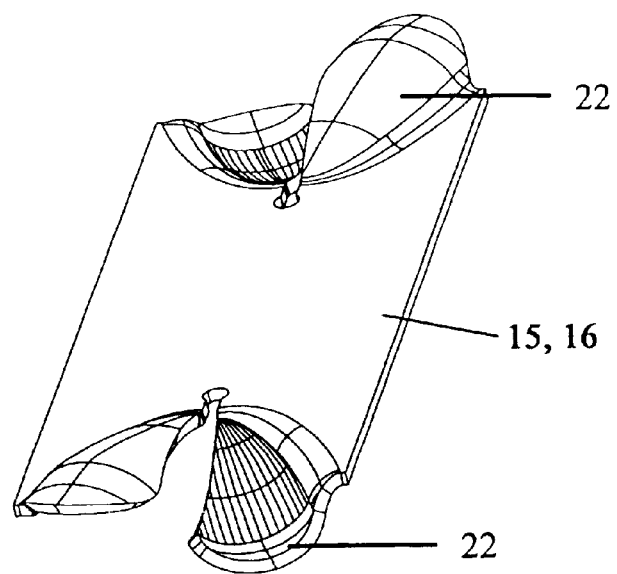
FIG. 6 is a perspective view of one grid strip constituting the spacer grid of FIGS. 5a and 5b.

As shown in FIG. 6, the dipper-shaped coolant mixing vane 22 (hereinbelow, referred to simply as "dipper vane"), formed at each of the upper and lower ends of the grid strip 15 or 16, is designed to be specifically curved in a way such that each vane 22 is convex and concave and the upper and lower dipper vanes 22 are opposed to each other in the convex and concave direction. Due to such dipper vanes 22, the coolant is effectively changed in its flowing direction within the one cell grid 10a, thus forming an active swirling motion at positions around the top corners of the grid 10a.

In each of the dipper vanes 22, the concave portion performs a thermal hydraulic function capable of forming a swirling motion of the coolant, while the convex portion supports the fuel rod 25 within the cell of the grid 10. Since the upper and lower dipper vanes 22 are opposed to each other in the convex and concave direction as described above, the four upper support points, provided at the upper end of the grid 10a, and the four lower support points, provided at the lower end of the grid 10a, are alternately positioned along the boundary of the grid 10a. In the present invention, the upper and lower dipper vanes of each strip may have the same configuration as shown in FIGS. 5a and 5b or may have different configurations as shown in FIG. 7.

Figure 7:
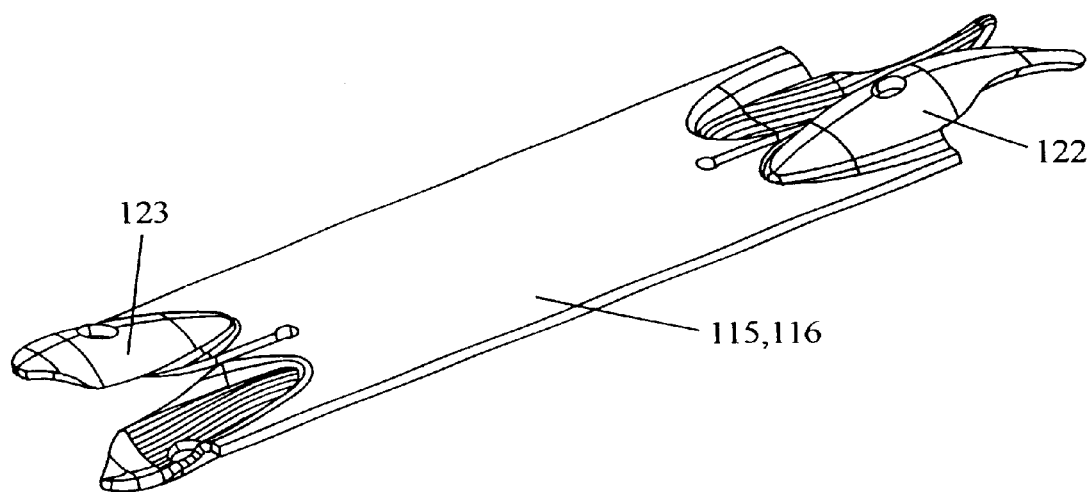
FIG. 7 is a perspective view of one grid strip constituting the spacer grid in accordance with the first modification of the primary embodiment of this invention, with the dipper vanes being altered so as to reduce the pressure drop and to improve the mixing effect of coolant within a fuel assembly.

FIG. 7 is a perspective view of one grid strip constituting the spacer grid in accordance with the first modification of the primary embodiment of this invention, with the dipper vanes being altered so as to reduce the pressure drop and to improve the mixing effect of coolant within a fuel assembly. A hole is formed on each of the dipper vanes 122 and 123 of FIG. 7 so as to allow the vane to be free from a pressure difference between the coolant flowing on the concave portion and the convex portion.

Figure 8:
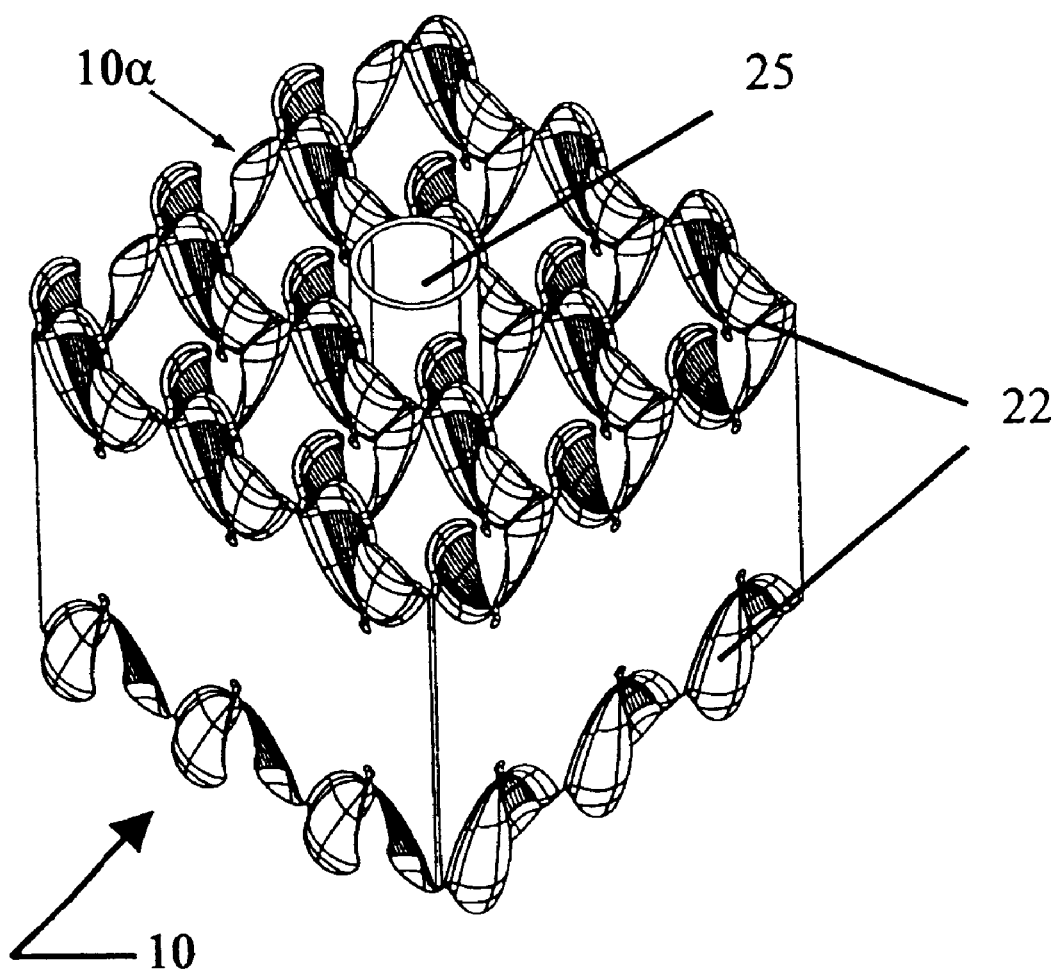
FIG. 8 is a perspective view of a spacer grid, fabricated using the strips of FIG. 6 and designed to be used in a nuclear fuel assembly having a 3×3 array.
Figure 9:
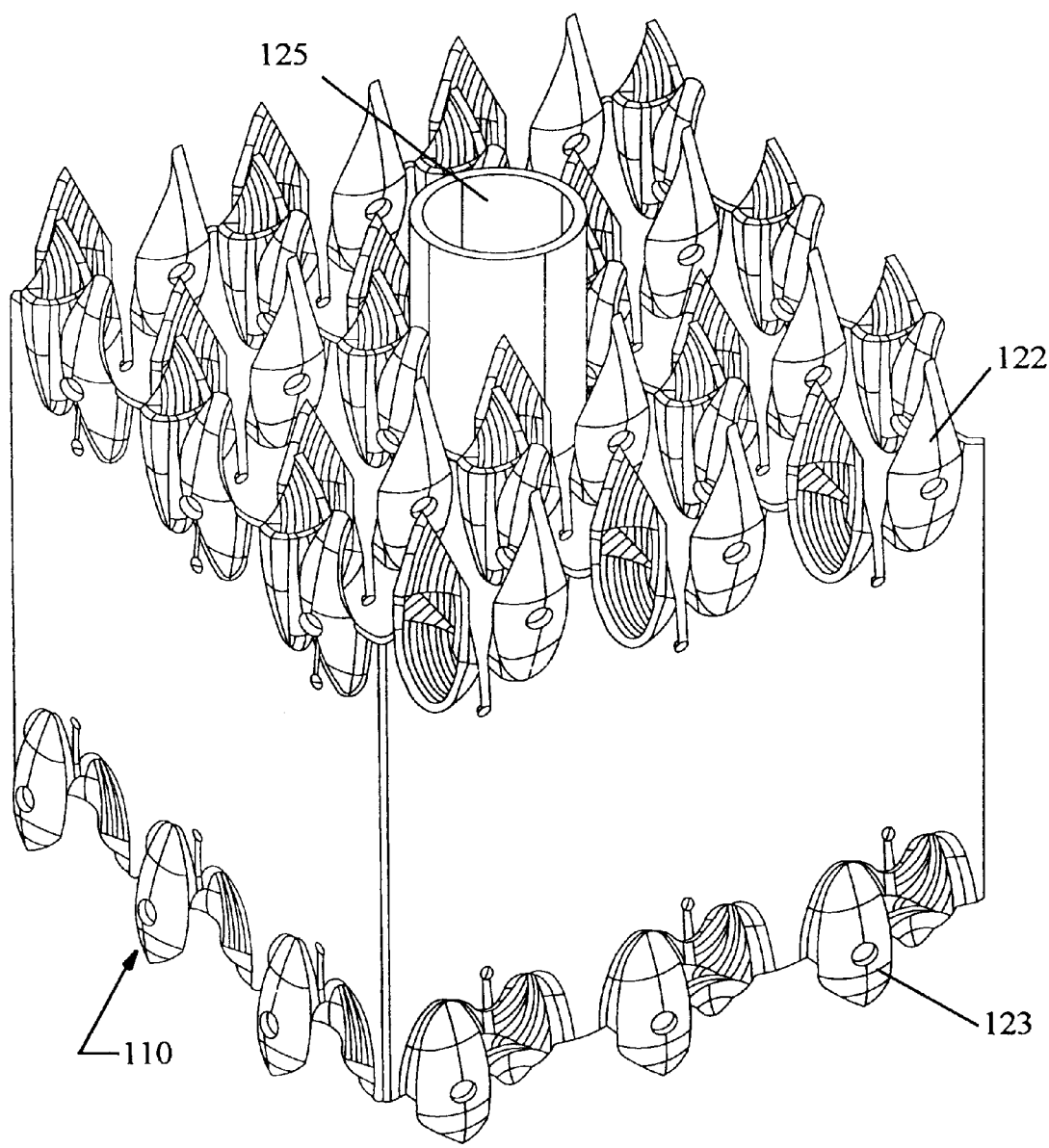
FIG. 9 is a perspective view of a spacer grid fabricated using the strips of FIG. 7 and designed to be used in a nuclear fuel assembly having a 3×3 array.

FIG. 8 is a perspective view of a spacer grid 10, fabricated using the strips 15 and 16 of FIG. 6 and designed to be used in a nuclear fuel assembly having a 3×3 array. FIG. 9 is a perspective view of a spacer grid 110 fabricated using the strips 115 and 116 of FIG. 7 to be used in a nuclear fuel assembly having a 3×3 Array In the drawings, only one fuel rod 25, 125 is shown to be placed and supported within one cell of the grid 10, 110. Of course, it should be understood that the spacer grid 10, 110 of this invention may be designed to form a desired array, for example, a 14×14, 16×16, or 17×17 array.

Figure 10A:
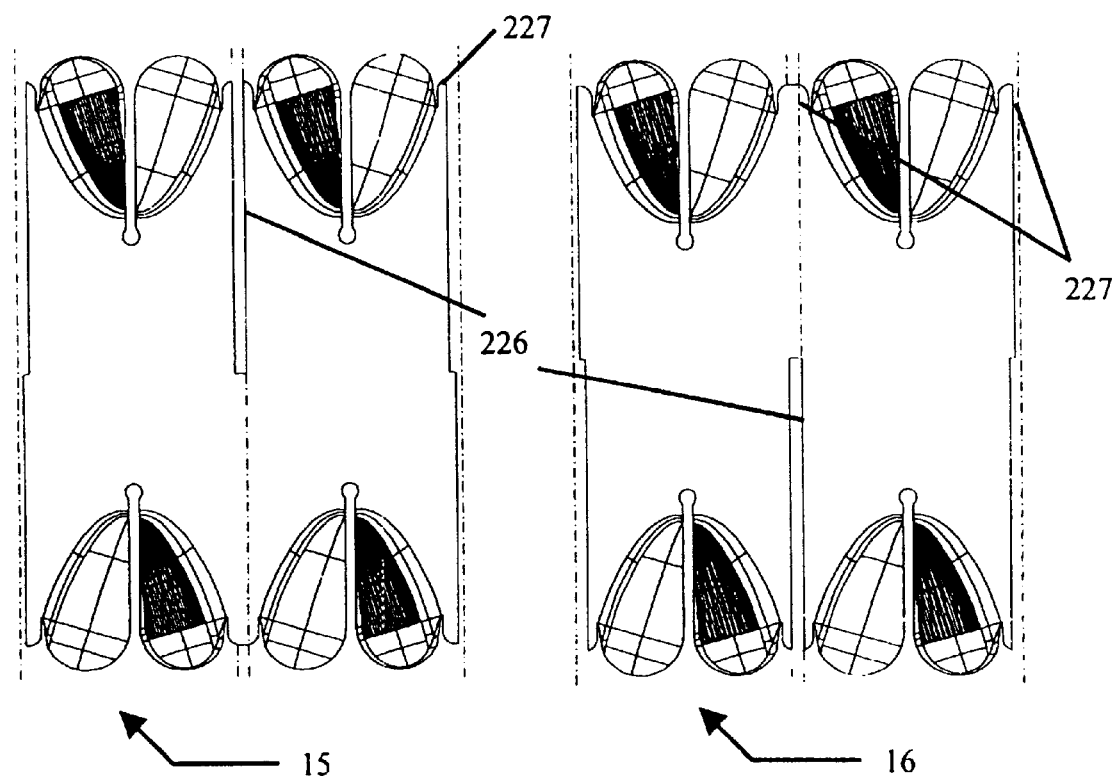
FIG. 10a is a front view of the grid strips constituting the spacer grid according to the primary embodiment of this invention.
Figure 10B:
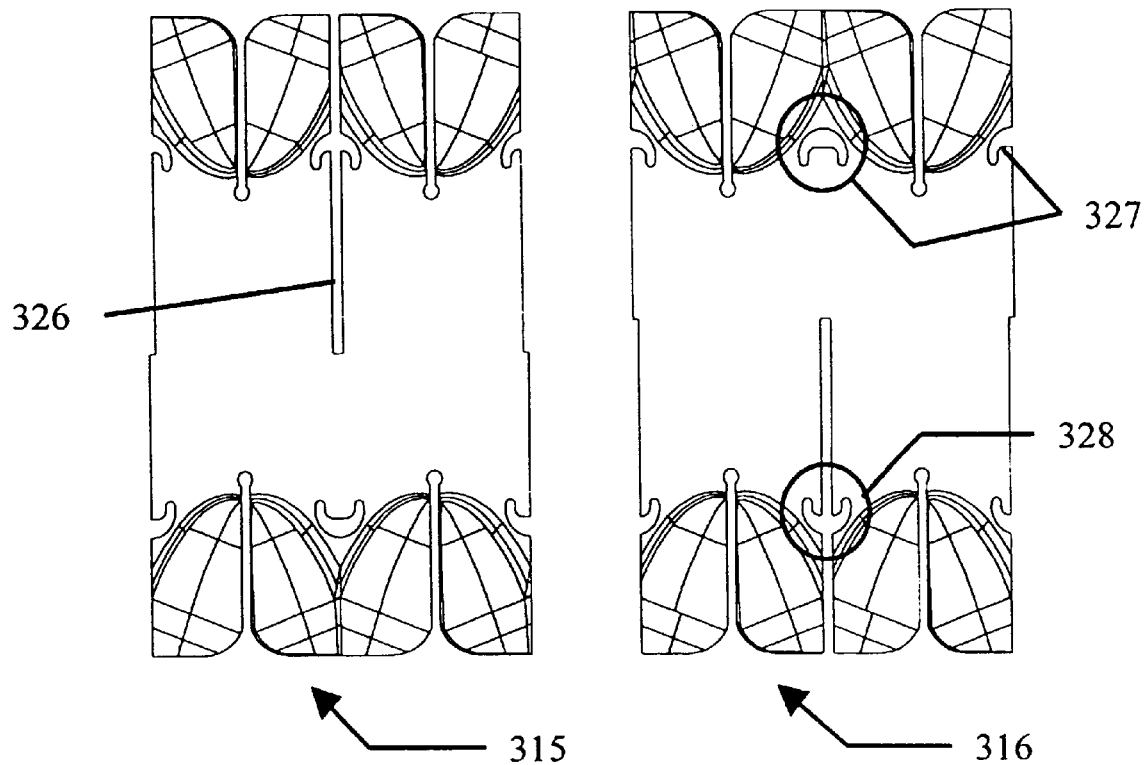
FIG. 10b is a front view of grid strips, with the welded portions of the strips being altered from the structure of FIG. 10a in accordance with the second modification of the primary embodiment of this invention.

FIG. 10a is a front view of the grid strips constituting spacer grid according to the primary embodiment of this invention. FIG. 10b is a front view of grid strips, with the welded portions of the strips being altered from the structure of FIG. 10a in accordance with the second modification of the primary embodiment of this inventions. As shown in the drawings, the strips 15, 16, 315, 316, are generally classified into two types in accordance with the position of axial slots 226 and 326 extending from the ends of the strips to a depth. In order to fabricate a spacer grid using the strips 15, 16, 315, 316, the strips are assembled with each other by intersecting the strips at the slots 226, 326, thus forming a plurality of four-walled cells individually having four intersections. After the strips 15, 16, 315, 316 are assembled together as described above the strips are welded to each other. In the case of the strips 15, 16 of FIG. 10a, the assembled strips 15, 16 are welded together at the welding taps 227 formed at the ends of the slots 226. On the other hand, the assembled strips 315, 316 of FIG. 10b are welded together at the arcuate welding taps 327, 328 formed on the slots 326. When such arcuate welding taps 327, 328 are formed on the slots 326 as shown in FIG. 10b, it is possible to use the end portions of the intersections of the spacer grid as the dipper vanes, thus forming a stronger swirling motion of the coolant within the grid. In the present invention, the to process of welding the taps 227, 327, 328 is effectively performed through a TIG welding process or a laser beam welding process regardless of the positions of the taps 227, 327, 328 on the slots 226, 326.

In the spacer grid 10 of this invention, each of the dipper vanes 22 supports a fuel rod 25 at its concave portion within the cell of the grid 10. Therefore, it is not necessary to cut away the grid strips 15, 16, 315, 316 at any portion for forming separate springs or dimples, and so the strips are free from a reduction in the effective sectional area. This finally increases the mechanical and structural strength of the strips.

Since it is not necessary to cut away the grid strips 15, 16, 315, 316 at any portion for forming separate springs or dimples, the strips effectively prevent undesired lateral flow of coolant within the spacer grid. This allows the coolant to smoothly flow within the fuel assembly and allows the fuel rods 25 to be free from vibration.

In one cell spacer grid 10a of this invention, the fuel rod 25 is supported by the dipper vanes 22 at four points at each of the upper and lower ends of the grid 10a. That is, the fuel rod supporting structure of the spacer grid 10a of this invention is improved, with the number of fuel rod supporting points within the grid 10a being increased in comparison with the conventional grids. The spacer grid 10a of this invention thus minimizes a fretting wear of the fuel rods 25 different from the conventional grid. Such a fuel rod supporting structure of this invention is more advantageous due the structure of spring-fuel rod-spring capable of absorbing external impact in double directions in comparison with the conventional structure of spring-fuel rod-dimple designed to absorb external impact in a single direction.

In the spacer grid of this invention, the lower dipper vanes 22 control the amount and flowing direction of inflow coolant for one cell spacer grid 10a, while the upper dipper vanes 22 cooperate with the lower dipper vanes so as to form more active swirling motion of coolant within the fuel assembly. Such an active swirling motion of coolant within the fuel assembly is caused by the fact that the upper and lower dipper vanes 22 are opposed to each other in the convex and concave direction. Due to such shaped dipper vanes 22, it is possible to accomplish an axially twisted effect of one cell spacer grid 10a. This allows the coolant to maintain the desired active swirling motion within the total length of the fuel assembly. In the present invention, it should be understood that the upper and lower dipper vanes may be altered in shape and size as desired. The dipper vanes may be also formed with holes capable of accomplishing a uniform pressure distribution on the concave and convex portions while forming more active swirling motion of coolant within a fuel assembly.

Such a swirling motion of the coolant within the fuel assembly improves the heat transferring efficiency from the elongated fuel rods 25 to the coolant and improves the thermal output power of a nuclear power plant. This is well known to those skilled in the art and further explanation is thus not deemed necessary.

As described above the present invention provides a nuclear fuel spacer grid with dipper vanes. The spacer grid of this invention is designed to accomplish the effective operation of a nuclear fuel assembly and to minimize the fretting wear of the fuel rods, which is the important factor causing damage of the fuel assembly. The spacer grid of this invention improves the mechanical stability and safety of the fuel assembly, thus accomplishing the safety of a nuclear power plant even in case of the occurrence of an emergency. The spacer grid is also designed to allow coolant to smoothly flow within the fuel assembly and to result in a high coolant mixing effect. The spacer grid finally improves the thermal hydraulic performance of the nuclear power plant.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A nuclear fuel spacer grid for supporting a plurality of elongated fuel rods within a nuclear fuel assembly, comprising:

a plurality of windowless grid strips, each grid strip having an axial slot for allowing the plurality of grid strips to be intersected to define a plurality of cells for receiving a fuel rod; and a coolant mixing vane extending from upper and lower ends of each of the plurality of grid strips, each of the coolant mixing vanes having a convex portion and a concave portion wherein the concave portion forms a swirling motion of coolant in the nuclear fuel assembly and the convex portion supports a fuel rod within a cell with convex portions of mixing vanes on other of the plurality of grid strips forming the cell.

2. The nuclear fuel spacer grid according to claim 1, wherein the convex portion and concave portion of each coolant mixing vane are opposed to each other in the convex and concave direction for swirling upwardly flowing coolant within the fuel assembly and forming an active swirling motion of the coolant at a position around each intersection of the grid strips.

3. The nuclear fuel spacer grid according to claim 1, wherein each of the coolant mixing vanes elastically supports the fuel rod at the convex portion used as a spring.

4. The nuclear fuel spacer grid according to claim 3, wherein the coolant mixing vanes form a fuel rod supporting structure capable of supporting a fuel rod at four upper support points and at four lower support points.

5. The nuclear fuel spacer grid according to claim 2, wherein the coolant mixing vanes of each grid strip are different from each other in structure, thus reducing a pressure drop of coolant flowing on the vanes and forming a more active swirling motion of the coolant, within the fuel assembly.

6. The nuclear fuel spacer grid according to claim 2, wherein the coolant mixing vanes of each grid strip are individually provided with a hole capable of reducing the pressure difference between the coolant flowing on the concave portion and convex portion of said coolant mixing vanes.

* * * * *